United States Patent
Hsiao

(12) 
(10) Patent No.: US 6,301,436 B1
(45) Date of Patent: Oct. 9, 2001

(54) PHOTOTHERMIC DESOLDERING UNIT

(76) Inventor: Yu-Ju Hsiao, No. 14, Alley 70, Lane 469, Liancheng Rd., Junghe City, Taipei (TW)

( * ) Notice: Subject to any disclaimer, the term of this patent is extended or adjusted under 35 U.S.C. 154(b) by 0 days.

(21) Appl. No.: 09/686,625

(22) Filed: Oct. 12, 2000

(51) Int. Cl.[7] .............................. B23K 1/018; B23K 3/047
(52) U.S. Cl. ...................... 392/418; 219/85.12; 228/264
(58) Field of Search .................... 392/418, 422, 392/426, 419–421; 219/85.12, 85.13; 228/264, 191

(56) References Cited

U.S. PATENT DOCUMENTS

| | | | |
|---|---|---|---|
| 2,166,728 | * | 7/1939 | Page ...................................... 392/418 |
| 2,710,331 | * | 6/1955 | Stegeman ............................. 392/418 |
| 3,205,572 | * | 9/1965 | Jochems ................................ 392/418 |
| 3,710,069 | * | 1/1973 | Papadopoulos et al. ............ 392/421 |
| 3,764,772 | * | 10/1973 | Matuschek ........................ 219/85.12 |
| 3,765,475 | * | 10/1973 | Hooper .................................. 392/426 |
| 3,789,853 | * | 2/1974 | Reinhard .............................. 392/418 |
| 4,270,260 | * | 6/1981 | Krueger ................................ 219/411 |
| 4,575,608 | * | 3/1986 | Wictorin et al. .................. 219/85.13 |
| 5,278,938 | * | 1/1994 | Spigarelli et al. .................... 392/420 |
| 5,552,579 | * | 9/1996 | Krueger ................................ 219/411 |

FOREIGN PATENT DOCUMENTS

| | | | |
|---|---|---|---|
| 735064 | * | 8/1955 | (GB) .................................... 392/418 |
| 61-46822 | * | 3/1986 | (JP) . |
| 6-260147 | * | 9/1994 | (JP) . |
| 10-41360 | * | 2/1998 | (JP) . |

OTHER PUBLICATIONS

Lissner, R.W., "Module Removing Tool", IBM Tech. Discl. Bull., vol. 11, No. 10, Mar. 1969.*
Vavoso, G., "Removal of Soldered Components", IBM Tech. Discl. Bull., vol. 12, No. 12, May 1970.*

* cited by examiner

Primary Examiner—John A. Jeffery
(74) Attorney, Agent, or Firm—Michael D. Bednarek; Shaw Pittman LLP

(57) ABSTRACT

A photothermic desoldering unit includes a console provided with a switch and a temperature control knob, and a working frame mounted on a top of the console. A light source is provided in the working frame and an aluminum plate is fixed near an open top of the working. frame to close the same and reflect light emitted from the light source. Temperature sensors are provided at an inner side of the aluminum plate to sense a surface temperature thereof. Power supply to the light source and luminance of the light source are controlled by the switch and the temperature control knob, respectively. When a surface temperature of the aluminum plate sensed by the sensors is the same as a temperature value set through the temperature control knob, power supply to the light source is disconnected. Light from the light source generates heat that is reflected by the aluminum plate to a circuit board disposed on top edges of the working frame to melt solder surrounded a target electronic element, allowing the target electronic element to be removed from the circuit board without causing deformation of the circuit board or damage to adjacent electronic elements.

5 Claims, 3 Drawing Sheets

PHOTOTHERMIC DESOLDERING UNIT

BACKGROUND OF THE INVENTION

The present invention relates to a desoldering unit for removing an electronic element from a circuit board by melting solder surrounded the electronic element, and more particularly to a photothermic desoldering unit that employs the effect of light and heat to provide even desoldering temperature to melt solder for removal of an electronic element from a circuit board without damaging the circuit board and other adjourning electronic elements.

A desoldering unit is particularly designed for melting solder surrounded electronic elements soldered onto a circuit board, so that the electronic elements may be removed from the circuit board for replacement or repair. Currently, there are three types of desoldering apparatus frequently employed in the electronic industrial field, namely, hot-air blower, BGA (Ball Grid Array) Rework Station, and compact desoldering heater.

The hot-air blower produces hot air and blows the same directly toward a target electronic element that is to be removed from a circuit board (see the attached reference document), so that solder surrounded the target electronic element is molten to release the electronic element from the circuit board. Thereafter, a vacuum suction tube is used to suck the released electronic element to move it from the circuit board. Since hot air from the hot-air blower not only blows toward the target electronic element to be removed but also areas on the circuit board in vicinity of the target electronic element, the hot-air blower is only suitable for desoldering electronic elements fixed on the circuit board of a surface mount device (SMD). Since it is uneasy to control a distance between the blower and the target electronic element to be removed and the temperature of hot air used to melt the solder surrounded the target electronic element, areas on the circuit board adjacent to the target electronic element tend to be heated, softened and deformed and could no longer be utilized normally.

The BGA Rework Station is a unit designed for professional use and is very expensive (see the attached reference document). It also employs the physical principle of hot air and therefore has the same disadvantages as the hot-air blower, such as uneven distribution of hot air over the circuit board and the target electronic element, undesired damage of adjourning electronic elements on the same circuit board, etc. Moreover, the BGA Rework Station is only suitable for electronic elements on electronic devices using BGA type package that represents connection of electronic elements only to the surface of a circuit board.

An example of the compact desoldering heater is shown in FIGS. 1 and 2. As shown, the compact desoldering heater mainly includes a console 1 on which a switch 11 and a temperature control knob 12 are provided, and a heating element 13 horizontally mounted on a top of the console 1. A surface temperature of the heating element 13 is controlled through the switch 11 and the temperature control knob 12. To use the compact desoldering heater to melt solder and remove an electronic element 21 from a circuit board 2, the circuit board 2 is positioned directly on the heating element 13 with pins 22 projected from a bottom surface of the electronic element 21 immediately on a top surface of the heating element 13. Heat from the heating element 13 melts solder surrounded the pins 22 to achieve the purpose of removing the target electronic element 21 from the circuit board 2. Such compact desoldering heater melts the solder by directly contacting with and heating the solder and is only suitable for contacting with a rear side of the circuit board 2. More specifically, the compact desoldering heater is only applicable for electronic elements on electronic devices using Dual In-line Package (DIP) in which pins are downward extended through the circuit board.

In view that the above-mentioned conventional desoldering apparatus have their respective disadvantages and each of them could be applied to desolder and remove electronic element limited to only one single type of package, it is desirable to develop a universal desoldering unit that eliminates problems existing in the conventional desoldering apparatus, such as uneasily controlled eating temperature, softened and deformed adjourning areas on the circuit board, damaged adjacent electronic elements on the same circuit board, and could be used to desolder and remove electronic elements from circuit boards of electronic device of all kinds of packaging types, including SMD, BGA, and DIP types of packaging.

SUMMARY OF THE INVENTION

A primary object of the present invention is to provide a photothermic desoldering unit that uses heat produced by a light source to indirectly reach a temperature value needed to complete the desoldering.

Another object of the present invention is to provide a photothermic desoldering unit that is applicable to electronic elements on electronic devices using different packaging types, including SMD, BGA, DIP, etc.

A further object of the present invention is to provide a photothermic desoldering unit that enables good control of heating temperature to melt the solder surrounded the target electronic element without softening and deforming the circuit board or damaging adjacent electronic elements.

To achieve the above and other objects, the photothermic desoldering unit of the present invention mainly includes a console provided with a switch and a temperature control knob, and a working frame mounted on a top of the console. A light source is provided in the working frame and a reflective aluminum plate is fixed near an open top of the working frame to close the same and reflect light emitted from the light source. Temperature sensors are provided at an inner side of the aluminum plate to sense a surface temperature of the aluminum plate. Power supply to the light source and luminance of the light source are controlled through the switch and the temperature control knob, respectively. When a surface temperature of the aluminum plate sensed by the sensors is the same as a temperature value set through the temperature control knob, power supply to the light source is disconnected. Light from the light source generates heat that is reflected by the aluminum plate to a circuit board disposed on top edges of the working frame to melt solder surrounded a target electronic element on the circuit board, allowing the electronic element to be removed from the circuit board without causing deformation of the circuit board or damage of adjacent electronic elements.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
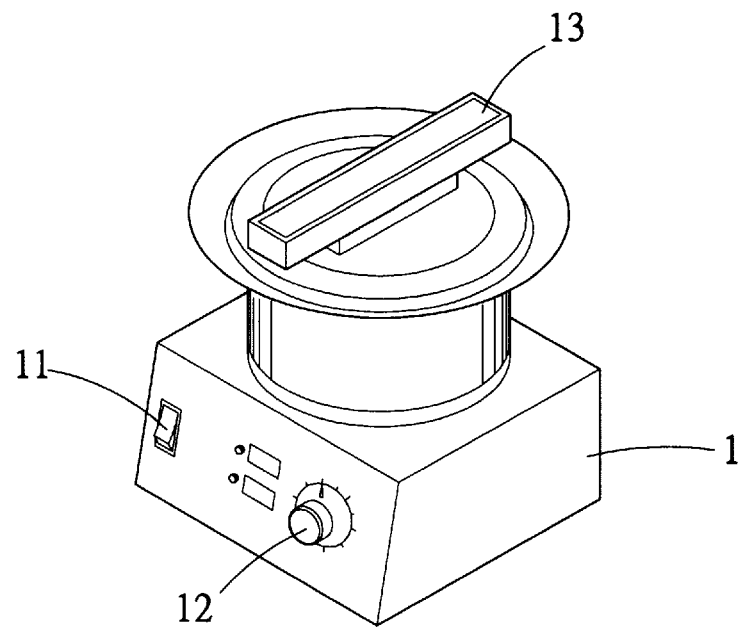
FIG. 1 is a perspective of a conventional compact desoldering heater.
Figure 2:
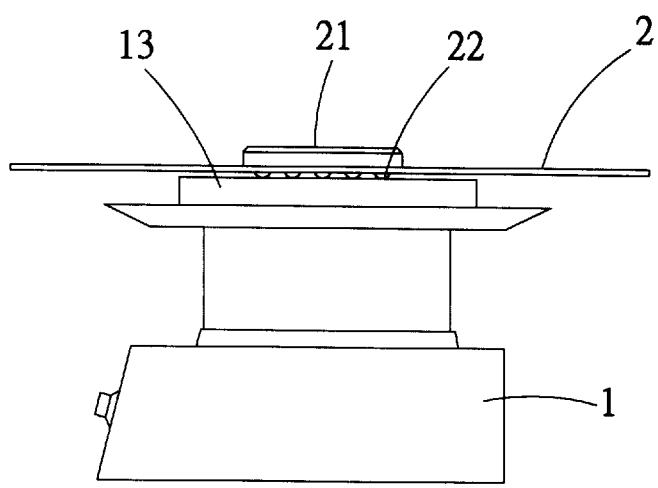
FIG. 2 is a side view showing the use of the conventional compact desoldering heater of FIG. 1 to desolder and remove an electronic element from a circuit board.
Figure 3:
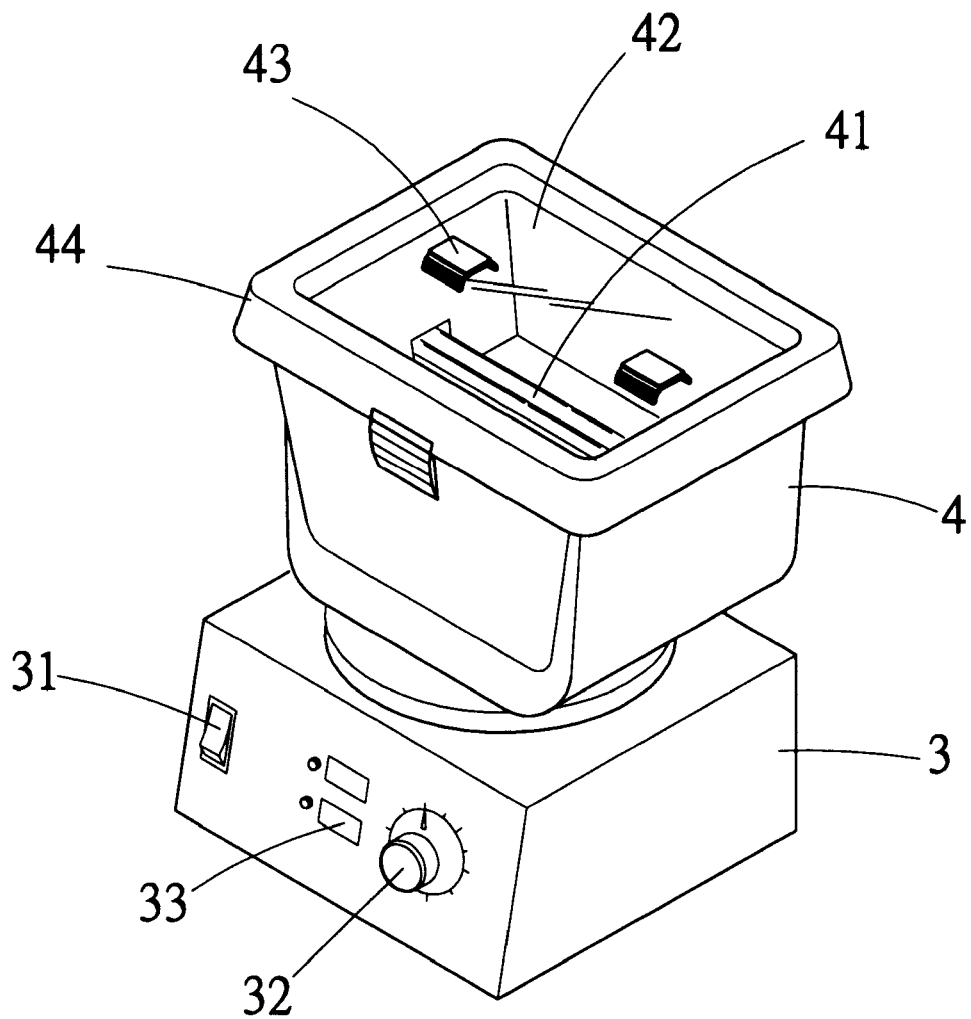
FIG. 3 is a perspective of a photothermic desoldering unit according to the present invention.

Please refer to FIG. 3 that is a perspective of a photothermic desoldering unit according to the present invention. As shown, the photothermic desoldering unit mainly includes a console 3 provided with a switch 31, a temperature control knob 32, and an indicating lamp 33, and an open-topped working frame 4 supported on a top of the console 3. A halogen lamp or a quartz lamp 41 is provided in the working frame 4, and a reflective aluminum plate 42 is horizontally fixed in the working frame 4 near top edges 44 of the working frame 4 to cover an open top of the working frame 4. The reflective aluminum plate 42 is provided at an inner side with a plurality of temperature sensors 42s for sensing a surface temperature of the reflective aluminum plate 42. Since the top edges 44 of the working frame 4 are slightly higher than the reflective aluminum plate 42 mounted in the working frame 4, at least two adjusting blocks 43 are spaced on an outer side of the reflective aluminum plate 42 to function like supporters. The adjusting blocks 43 are coated with heat-insulating rubber or other similar material and are therefore heat-resistant and would not melt at high temperature.

The switch 33 on the console 3 controls power supply to the console 3. The temperature control knob 32 controls a luminance of the halogen lamp or quartz lamp 41, and accordingly, the temperature of heat source correspondingly generated by the halogen lamp or quartz lamp 41. More specifically, the photothermic desoldering unit of the present invention utilizes changes in applied voltage corresponding to current to precisely control changes in temperature. The temperature sensors provided at inner side of the reflective aluminum plate 42 compare the sensed temperature with a temperature value set through the temperature control knob 32. When the surface temperature sensed by the temperature sensors is the same as the set temperature value, power supplied to the halogen or quartz lamp 41 is disconnected. The indicating lamp 33 indicates the ON/OFF state of the halogen or quartz lamp 41.

Figure 4:
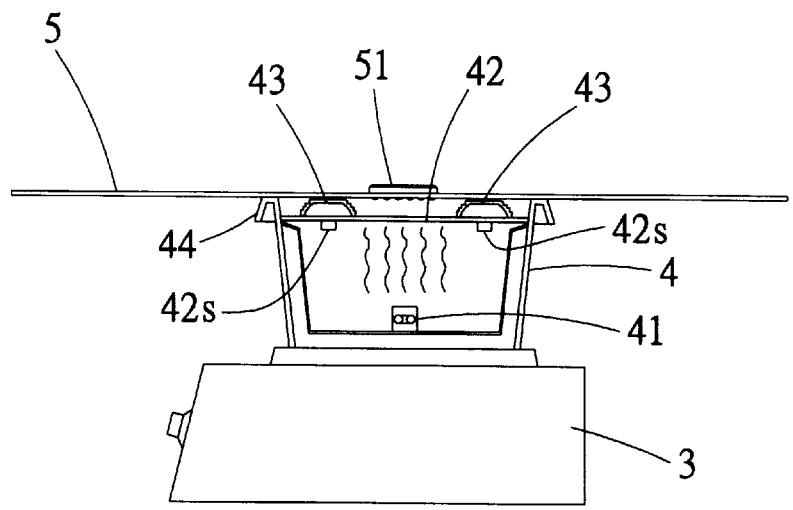
FIG. 4 is a side view showing the use of the desoldering unit of FIG. 3 to desolder and remove a target electronic element from a circuit board.
Figure 5:
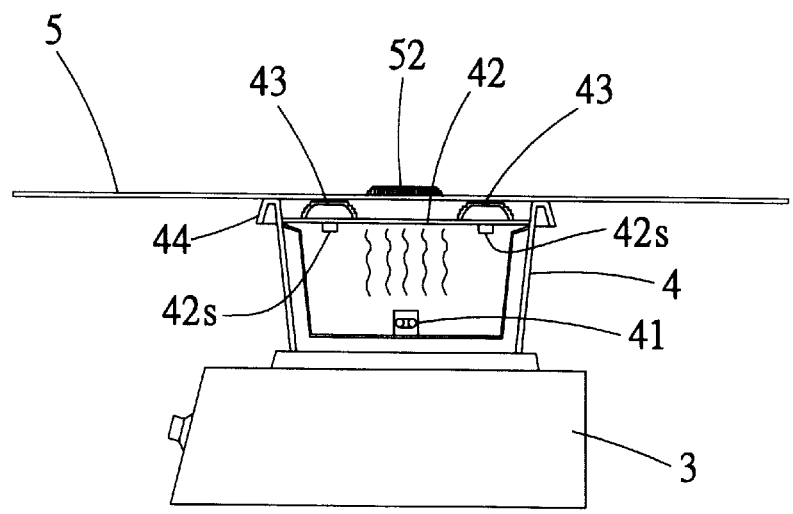
FIG. 5 is another side view also showing the use of the desoldering unit of FIG. 3 to desolder and remove a target electronic element from a circuit board.

Please now refer to FIGS. 4 and 5 that show two examples of use of the photothermic desoldering unit of the present invention to remove target electronic elements 51, 52 from a circuit board 5 through desoldering. To do so, the circuit board 5 is positioned over the working frame 4 and supported on the top edges 44. A proper temperature is selected through the temperature control knob 32 for the halogen or quartz lamp 41, so that the halogen or quartz lamp 41 produces heat through a photothermic effect. Heat produced by the halogen or quartz lamp 41 is reflected by the reflective aluminum plate 42 to a surface of the circuit board 5 facing toward the working frame 4, causing solder surrounded the target electronic element 51, 52 to melt and therefore allowing removal of the target electronic element 51, 52 from the circuit board 5. In the example shown in FIG. 4, the electronic element 51 is a DIP-type element; and in the example shown in FIG. 5, the electronic element 52 is an SMD-type or a BGA-type element. The light generated by the halogen or quartz lamp 41 provides the heat source needed to desolder the electronic element 51, 52. In other words, the solder surrounded the electronic element 51, 52 is indirectly heated by the light emitted from the halogen or quartz lamp 41 to melt. This kind of indirect heating is applicable to electronic elements of all packaging types and has the advantage of easily controlled temperature. Meanwhile, the provision of the adjusting blocks 43 advantageously protects portions of the circuit board 5 in the vicinity of the target electronic element 51, 52 against softening and deformation. Other electronic elements adjacent to the target electronic element 51, 52 may also be protected from unwanted damage.

The following are some advantages of the present invention due to its special structure:

1. In the indirect heating, the heat source does not get in direct contact with the circuit board or the target electronic element and would not cause melting or deformation of the circuit board or the target electronic element.
2. The temperature of the desoldering unit rises evenly and could be easily controlled.
3. The adjusting blocks 43 are coated with insulating rubber material to resist high temperature without becoming molten and could therefore provide good supporting effect to protect the circuit board supported thereon from softening and deformation.
4. The same one photothermic desoldering unit is applicable to electronic elements of various packaging types, including SMD, BGA and DIP types.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A photothermic desoldering unit, comprising a console on which a switch and a temperature control knob are provided, and an open-topped working frame mounted on a top of said console, the open-topped working frame having a top edge;

said photothermic desoldering unit being characterized in that said working frame includes an internal light source and a reflective aluminum plate horizontally fixed at a location within the working frame spaced from the top edge of said working frame to close an open top of said working frame and reflect light emitted from said light source;

said aluminum plate being provided at an inner side with temperature sensors to sense a surface temperature of said aluminum plate, said switch controlling power supply to said console and accordingly said internal light source, and said temperature control knob controlling a luminance of said internal light source;

whereby when a surface temperature of said aluminum plate sensed by said temperature sensors is the same as a temperature value set through said temperature control knob, power supply to said light source is disconnected;

and support means for supporting a circuit board at a predetermined distance from the aluminum plate so that the circuit board is out of contact with the aluminum plate.

2. A photothermic desoldering unit as claimed in claim 1, wherein said light source is a halogen lamp.
3. A photothermic desoldering unit as claimed in claim 1, wherein said light source is a quartz lamp.
4. A photothermic desoldering unit as claimed in claim 1, wherein the support means includes at least one adjusting block coated with an insulating material.
5. A photothermic desoldering unit as claimed in claim 1, wherein the top edge of the working frame supports the circuit board out of contact with the aluminum plate.

* * * * *